United States Patent [19]

Ou

[11] Patent Number: 4,458,437
[45] Date of Patent: Jul. 10, 1984

[54] SIGNAL DEVICE FOR USE IN FISHING

[76] Inventor: Wen-Show Ou, 1st Fl., No. 10, La. 154, Hsiu Wen St., Kao Hsiung, Taiwan

[21] Appl. No.: 381,852

[22] Filed: May 25, 1982

[51] Int. Cl.³ ............................................. A01K 97/12
[52] U.S. Cl. ....................................................... 43/17
[58] Field of Search ...................................... 43/17, 16

[56] References Cited

U.S. PATENT DOCUMENTS 3,134,187  5/1964  Blakely ................................. 43/17
4,266,217  5/1981  Kao ....................................... 43/17
4,384,425  5/1983  Lemons ................................. 43/17

Primary Examiner—Gene P. Crosby
Attorney, Agent, or Firm—Burns, Doane, Swecker & Mathis

[57] ABSTRACT

A signal device for use in fishing includes an adjustable contact member and a slidable contact member which can be moved into contact with each other by a fish when striking the bait to cause energization of a relay means for controlling the operation of a buzzer and lamp system. A normally closed reset switch is provided for maintaining the energization of the relay means in case the two contact members are out of contact with each other so that signals from the buzzer and lamp system are continuously produced to positively warn of a hooked fish.

4 Claims, 5 Drawing Figures

SIGNAL DEVICE FOR USE IN FISHING

The present invention relates to a signal device for use in fishing which warns of a hooked fish by producing continuous sound and light signals when twitches by the fish at the fishing line occasion the actuation of a switch provided therein.

Known fishing signal devices may include a bell attached to the tip of the fishing rod so as to signal by ringing when caused to vibrate by a fish nibbling at the bait or lure. They may also include a float designed to actuate a light device. But in such unfavorable fishing conditions as fast currents or wavy waters, these conventional signal devices tend to give false signals, thus leading to the fisherman's difficulty in judging whether a fish is positively hooked and to unnecessary frequent inspections.

In order to overcome this problem, it is known, for example through Japanese Patent Publications Nos. 50-19984 and 54-17184 to take advantage of the tension caused by a fish pulling at the fishing line to close an electric circuit which controls a buzzer or lamp. However, such device still leaves much to be desired. For instance, if the fish discontinues its pull at the line, the electric circuit will be interrupted so that sound or light signals produced by the buzzer or lamp disappear immediately. In that case, if the fisherman happens to take no heed of that momentary signals, he will probably miss the chance of catching that fish. Furthermore, since this device relies on the pulling force of a fish to cause two contact elements to move into contact with each other, the movable parts in the device sometimes cannot stand up to the impact imposed by a fish struggling to escape and therefore tend to break down.

The present invention is directed particularly toward a fishing signal device which is reliable, adjustable as well as durable with a view toward ameliorating the aforesaid disadvantages.

Briefly stated, in accordance with a first aspect of the invention, there is provided a fishing signal device which comprises a casing adapted to be fastened to the lower portion of a fishing rod, an actuation switch consisting of an adjustable contact member and a slidable contact member, a reset switch, a relay, a battery, and a buzzer and lamp system. The slidable contact member and the adjustable contact member are spaced from each other so that the former can, in response to the pulling force of a fish, be moved into contact with the latter to close the actuation switch. The closed actuation switch then causes energization of the relay, which in turn connects two pairs of relay contacts respectively to switch on the buzzer and lamp system. Preferably the reset switch may be of the normal-on type so that once the relay is energized the current supply from the battery to the buzzer and lamp system cannot be cut off by opening of the actuation switch without opening of the reset switch. Thus the buzzer and lamp system is continuously operative as long as the reset switch remains in closed position.

The invention further contemplates, in accordance with another of its aspects, an adjusting means for adjusting the distance between the normally spaced-apart slidable and adjustable contact members to suit fishing conditions. The adjusting means may be in the form of a hollow screw within which one end of the adjustable contact member is received. The screw is turnably supported through an end wall of the casing and adapted to be turned to move relative to the casing to cause corresponding movement of the adjustable contact member.

In accordance with a further aspect, the invention contemplates a buffer means, preferably in the form of a compression spring housed in a chamber in the hollow screw, for lessening the impact imposed on the movable elements of the invention by a hooked fish. The compression spring encompasses the adjustable contact member between an end wall of the screw chamber and an end cap of the adjustable contact member such that when the pulling force of a hooked fish is transferred from the slidable contact member to the adjustable contact member, because of the resistance of the compression spring there will not be any sudden, sharp movement of the adjustable contact member that may result in breakdown of the same.

These and other features and advantages of the invention will be best understood from the following description of specific embodiments when read in connection with the accompanying drawings, in which.

Figure 1:
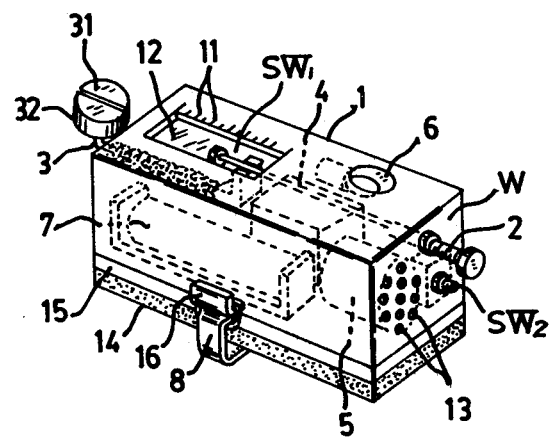
FIG. 1 is a perspective view of a preferred embodiment of the signal device according to the invention.

With reference to FIG. 1, there is illustrated an injection molded casing 1 of a plastic material for accommodating an adjustable contact member 2, a slidable contact member 3, a reset switch SW2, a relay 4, a buzzer 5, a lamp 6 and a battery 7.

The casing 1 may be a rectangular box having in its top wall a rectangular window 12 to allow visual access to the inner portion of the casing. Along the length of an edge of the window 12 there is provided a scale 11 for measuring the distance between two contacts which will be described in detail hereinafter. An end wall W of the casing is formed with a plurality of tiny openings 13 through which sound waves from the buzzer 5 may pass. The casing 1 is detachably attached to a bottom plate 15 which has a rubber or sponge pad 14 glued to its undersurface. On each of the opposite side walls of the casing there is an L-shaped lug 16 adjacent the bottom plate 15. An elastic binding strap 8 provided on its both ends with a metal ring within which each of the oppositely positioned lugs 16 can be engaged is utilized for detachably fastening the signal device of the invention to a fishing rod.

Figure 2:
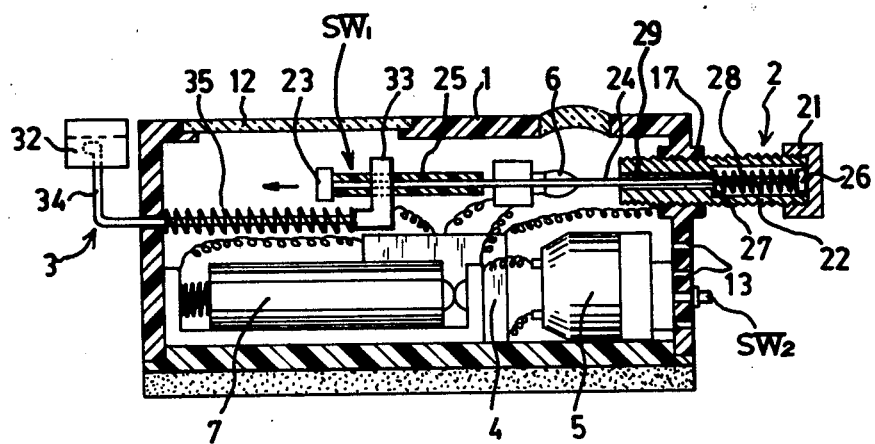
FIG. 2 is a longitudinal sectional view of the signal device shown in FIG. 1.

The casing 1 is further formed with a tubular hollow boss 17 protruding from opposite sides of the end wall W of the casing. The boss 17 is internally threaded to receive therein an adjusting screw 22 which has a turning knob 21 at one end. As illustrated in FIG. 2, the adjusting screw extends partially into the casing through the boss 17 with the turning knob 21 lying outwardly of the casing to enable the same to be turned from outside. Further, a chamber 27 is formed in the rear portion of the adjusting screw for reception therein of a compression spring 28, and an axial passage 29 in communication with the chamber extends therefrom toward the other end of the screw opposite the turning knob 21.

The adjustable contact member 2 includes an elongated rod 24 which is inserted through the passage 29 into the chamber 27 of the screw 22. The inner end of the rod 24 is formed with a contact 23 from which extends an insulating sleeve 25, and the other end of the rod 24 is provided with a cap 26 whereby the rod is biased into abutting relationship with the turning knob 21 by the compression spring 28 disposed between the cap 26 and the passage 29 of the screw 22.

The slidable contact member 3 includes an L-shaped rod 34, a forklike contact 33 and a line-gripping means 32. The L-shaped rod is inserted through a bore in the other end wall opposite the end wall W of the casing and is slidably held in suspension thereby with its upturned end lying outwardly of the casing. The forklike contact 33 is secured to the inner end of the rod 34 and spaced apart from the contact 23 on the rod 24 by means of a coil spring 35 encompassing the rod 34 between the contact 33 and the other end wall of the casing. On the upturned end of the rod 34 is secured the line-gripping means 32 which, as shown in FIG. 1, may be a piece of cylindrical rubber incised with a gash 31 about halfway deep into its upper surface into which the fishing line can be closely fitted and retained therein by friction.

Figure 3:
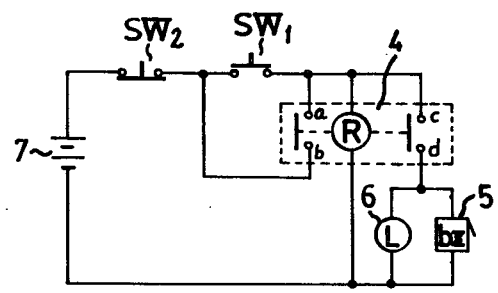
FIG. 3 is a schematic circuit diagram illustrating the signal device shown in FIGS. 1 and 2.

The rod 24 is slidably rested in the gap (FIG. 1) defined by the two prongs of the forklike contact 33 and is insulated therefrom by virtue of the insulating sleeve 25. Thus the contacts 23 and 33 constitute an actuation switch SW1 which, as shown in FIGS. 2 and 3, is in open position as a result of the two contacts being spaced apart from each other, whereas when the contact 33 is moved into contact with the contact 23 the switch SW1 is closed. As stated hereinbefore, through the window 12 and scale 11 the fisherman is able to read the distance between the contacts 23 and 33, and by turning the turning knob 21 of the screw 22 he can adjust the distance therebetween. For example, if the turning knob is turned clockwise the contact 23 will move away from the contact 33, and if the knob is turned counterclockwise the contact 23 will move toward the contact 33. This is of particular advantage where fishing conditions, for example, the size of fish to be caught, require such adjustments.

The reset switch SW2, preferably of the push-button type, may be installed below the adjustable contact member 2 within the casing and has a button protruding outwardly through a hole in the end wall W of the casing so as to be depressed from outside. It should be noted that when the signal device is in use the reset switch SW2 is maintained in closed position so that direct current from the battery 7 can flow therethrough to relay contact b as shown in FIG. 3. The purpose and advantage of this arrangement will be understood from the following description.

The lamp 6 can be so arranged that it can be readily seen; for example, in the embodiment of FIG. 1 it is placed underneath an elliptical window in the top surface of the casing. The buzzer 5 is mounted on the bottom plate 15 in the casing, facing the tiny openings 13 in the end wall W. The battery 7 and relay 4 are preferably so positioned that the signal device can be compact in size. The aforesaid components are properly interconnected to establish an electrical circuit illustrated in FIG. 3.

Figure 4:
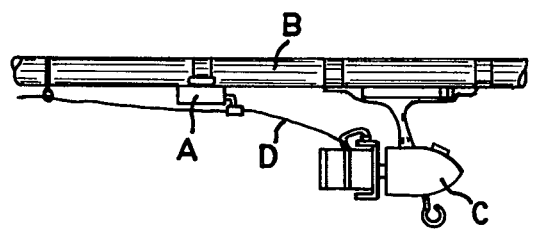
FIG. 4 is a schematic view of the signal device of the invention fastened to a fishing rod with a reel.

To use the signal device of the invention, the signal device, as indicated by A in FIG. 4, is fastened to a fishing rod B in front of a reel C by means of the binding strap 8 extended over the rod. A fishing line D is pulled from the reel C, fitted into the gash 31 in the line-gripping rubber 32, and retained in the gash by friction. In dependence upon the species and size of fish to be caught and the condition of currents, the distance between the contacts 23 and 33 is then adjusted in the manner described hereinbefore to obtain the optimum coordination of the two contacts. After pressing the button of SW2 to close the same, the fisherman only has to throw the baited hook into the water and wait for a fish to bite.

When a fish tries to make off with the bait and thus subjects the line D to tension, the line D, while being firmly gripped by the rubber 32, begins to transfer the tension to the rubber, which in turn forces the slidable rod 34 to move outwardly against the resistance of the spring 35. In synchronism with the outwardly moving rod 34 the contact 33 moves toward the contact 23 and then into contact therewith, thus closing the switch SW1 and permitting the current (SW2 being closed) to flow to the relay 4. The relay 4 is thus energized to cause relay contacts a and b and c and d to connect respectively, whereby the buzzer and lamp are switched on to produce sound and light signals to warn the fisherman of the hooked fish. It should be appreciated that in case the SW1 is released (i.e. the contact 33 is moved out of contact with the contact 23) owing to, for example, the release of the tension applied to the fishing line by the fish, the current supply from the battery to the buzzer and lamp via the relay contacts a, b and c, d which are already connected by the energization of the relay will not be cut off as long as the reset switch SW2 remains closed. In other words, once the buzzer and lamp are switched on they can never be switched off unless the SW2 is opened. It thus can be seen that the advantage of the SW2 resides in the fact that the sound and light signals can be produced continuously until the fisherman reacts to them by pressing the button of the SW2 to interrupt the established circuit.

If after the contacts 23 and 33 are brought into contact with each other the pulling force exerted by the fish remains in existence, the rod 24 will, by means of the engagement of the contacts 23 and 33, be moved simultaneously with the outwardly moving rod 34 against the resistance of the spring 28 in the chamber 27 of the screw 22. Once the spring 28 can no longer be compressed, the movement of the rod 24 is halted immediately, and so is the movement of the rod 34. In that case the line D will be forced to disengage from the gash 31 and hence freed from the the grip of the line-gripping means 32, with the springs 35 and 28 returning the slidable contact member 3 and the adjustable contact member 2 respectively to their original position. After opening the SW2 by pressing the button, the fisherman may recover the line off the reel to haul the hooked fish in.

By pressing the button to close the SW2, the signal device is ready for use again.

Figure 5:
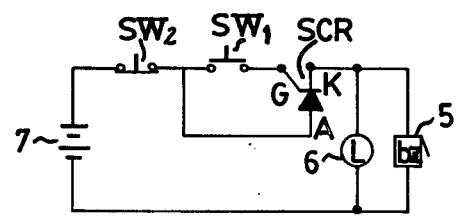
FIG. 5 is a schematic circuit diagram illustrating a second embodiment of the invention.

In the aforesaid embodiment of the invention, a relay means is utilized for controlling the operation of the buzzer and lamp system. As an alternative, however, the relay may be replaced by an SCR (Silicon Controlled Rectifier) to serve the same purpose, as illustrated in the circuit of FIG. 5.

It can be seen from the foregoing that the invention provides a signal device particularly suitable for use in fishing. The device employs a readily operable reset switch for the production of continuous signals whereby the fisherman will not miss a single chance of catching a fish. The use of an adjustable screw for adjusting the distance between two contacts permits of ready adaptation to different fishing conditions. Furthermore, with the presence of a spring in the screw chamber, the movable parts of the device encountering impacts from a hooked fish can be protected against breakdown, since sharp jerks by the fish are mitigated.

While only preferred embodiments of the invention have been described herein in detail, it will be understood that the invention is not limited thereby and modifications can be made within the scope of the appended claims.

I claim:

1. A signal device for use in fishing, comprising: a casing adapted to be fastened to the lower portion of a fishing rod; an adjustable contact member including an elongated rod having at one end thereof a contact and a hollow screw partially screwed into the casing through a threaded opening in one end wall of the casing, the other end of the elongated rod being axially movably received within the hollow screw and spring biased therein; a slidable contact member including an L-shaped rod partially inserted into the casing through a hole in the other end wall thereof and axially slidably supported thereby, the inner end of the L-shaped rod being formed with a contact spaced apart from the contact of said adjustable contact member by means of a spring and its outer upturned end being provided with a line-gripping means for releasably gripping the fishing line; a normally closed reset switch installed within the casing including a button protruding outwardly through said one end wall of the casing to be pressed from outside; electric components properly installed within the casing including a buzzer and lamp system, a relay means for controlling the operation of the system, and a battery; and an electric circuit wherein said contacts, relay means, buzzer and lamp system, reset switch and battery are properly connected by wires; and characterized in that said contact of said adjustable contact member and said contact of said slidable contact member constitute an actuation switch arranged to energize said relay means when said two contacts are moved into contact with each other so as to switch on said buzzer and lamp system whereby sound and light signals are continuously produced regardless of the peration of the actuation switch unless the reset switch is opened to interrupt the established circuit.

2. A signal device for use in fishing as claimed in claim 1, wherein said casing includes a bottom plate and a boxlike covering, said boxlike covering having in its top side a transparent window disposed above said actuation switch and a lug formed on each of its opposite side walls for providing securement of a binding strap of flexible material by which the signal device can be fastened to a fishing rod.

3. A signal device for use in fishing as claimed in claim 2, wherein said bottom plate has a pad of flexible material adhesively attached to its undersurface.

4. A signal device for use in fishing as claimed in claim 1, wherein said relay means in said electric circuit is replaced by a silicon controlled rectifier.

* * * * *